United States Patent [19]
Barrett et al.

[11] Patent Number: 5,736,688
[45] Date of Patent: Apr. 7, 1998

[54] CURVILINEAR LINEARIZATION DEVICE FOR TOUCH SYSTEMS

[75] Inventors: Gary L. Barrett, Austin, Tex.; Andrew L. Wolfe, Lawrenceville, N.J.

[73] Assignee: The Graphics Technology Company, Inc., Austin, Tex.

[21] Appl. No.: 510,440

[22] Filed: Aug. 2, 1995

[51] Int. Cl.⁶ .................................................. G08C 21/00
[52] U.S. Cl. ................................. 178/20; 178/18; 178/19
[58] Field of Search .............................. 178/18, 19, 20; 345/156, 173, 174, 176, 178, 180

[56] References Cited

U.S. PATENT DOCUMENTS

| | | | |
|---|---|---|---|
| 3,591,718 | 7/1971 | Asano | 178/19 |
| 3,632,874 | 1/1972 | Malavard | 178/18 |
| 3,798,370 | 3/1974 | Hurst | 178/18 |
| 4,071,689 | 1/1978 | Talmage et al. | 178/18 |
| 4,178,481 | 12/1979 | Kley | 178/18 |
| 4,198,539 | 4/1980 | Pepper, Jr. | 178/18 |
| 4,293,734 | 10/1981 | Pepper | 178/19 |
| 4,493,104 | 1/1985 | Lukis et al. | 382/13 |
| 4,622,437 | 11/1986 | Bloom et al. | 178/18 |
| 4,649,232 | 3/1987 | Nakamura | 178/18 |
| 4,661,655 | 4/1987 | Gibson | 178/18 |
| 4,725,695 | 2/1988 | Murdock et al. | 178/18 |
| 4,731,508 | 3/1988 | Gibson et al. | 178/18 |
| 4,777,328 | 10/1988 | Talmage, Jr. et al. | 178/18 |
| 4,797,514 | 1/1989 | Talmage | 178/18 |
| 4,822,957 | 4/1989 | Talmage, Jr. et al. | 178/18 |
| 5,041,701 | 8/1991 | Wolfe et al. | 178/18 |
| 5,045,644 | 9/1991 | Dunthorn | 178/18 |

*Primary Examiner*—Curtis Kuntz
*Assistant Examiner*—Vijay Shankar
*Attorney, Agent, or Firm*—Vinson & Elkins L.L.P.

[57] ABSTRACT

A contact input system with conductive segments made of a conductive ink and formed to follow a selected pattern that are located on a rectangular resistive surface. The conductive segments to the left of a T-shaped segment at the midpoint of each side are generally Z-shaped and those to the right of the midpoint are shaped like an inverted Z. The segments are disposed in a generally parabolic shape curving towards the center of the active surface area. The top bar of each segment overlaps at least a portion of the bottom bar of the adjacent conductive segment. The system thus has only two overlapping lines of conductive segments. The segments linearize electric fields in the resistive surface in order to provide greater accuracy in determining the location of a contact point on the surface.

23 Claims, 8 Drawing Sheets

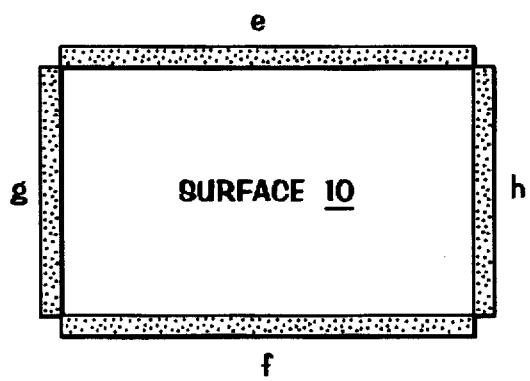
FIG. 3A
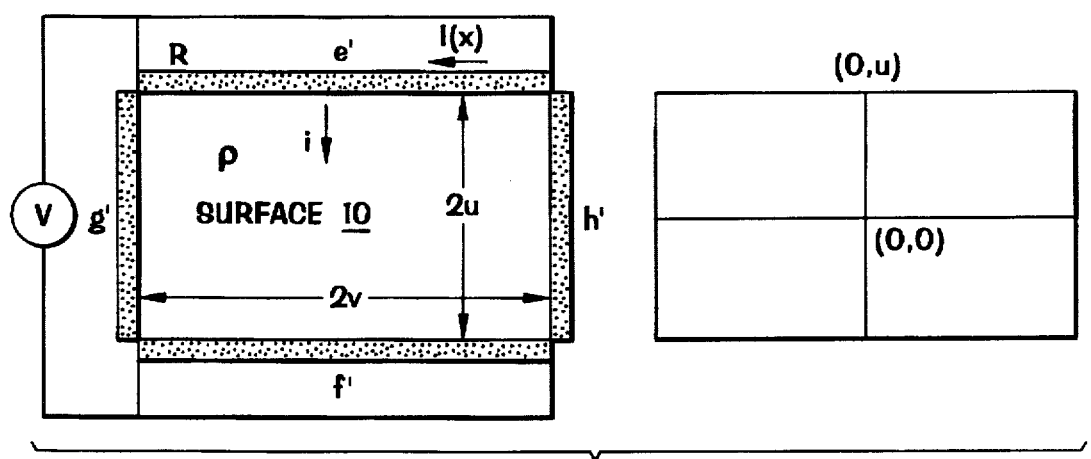
FIG. 3B
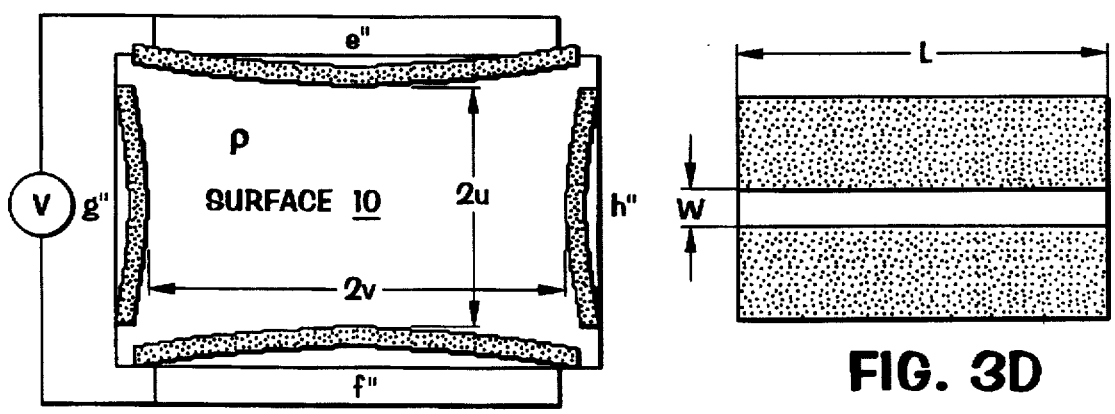
FIG. 3C
FIG. 3D

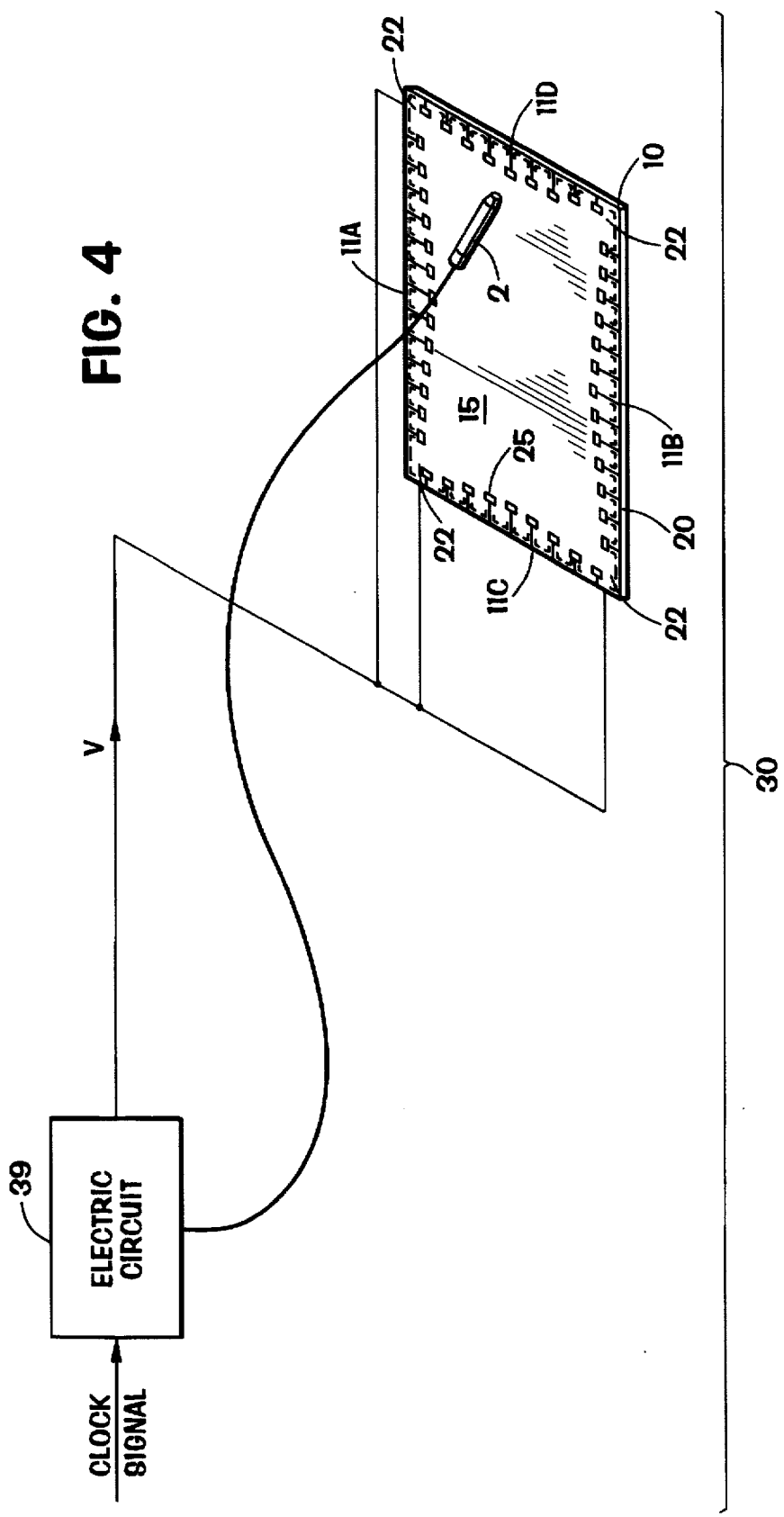

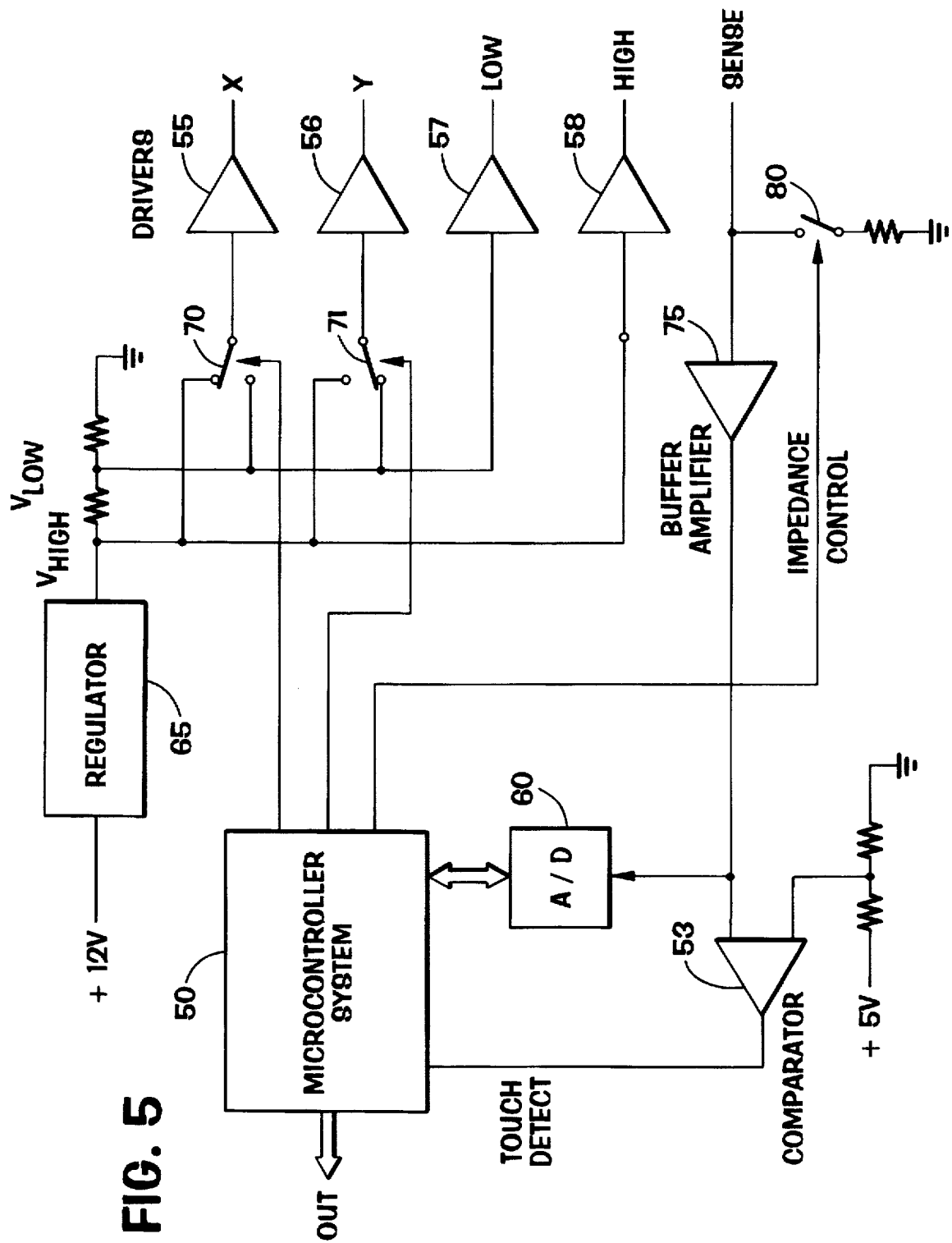

CURVILINEAR LINEARIZATION DEVICE FOR TOUCH SYSTEMS

FIELD OF THE INVENTION

This invention relates to a curvilinear edge linearization device for producing orthogonal electric fields in a surface and, more particularly, to an edge linearization device for producing orthogonal electric fields in a resistive surface for use in a contact input system which is able to locate an object in contact with the resistive surface.

BACKGROUND OF THE INVENTION

Touch input systems (also referred to as contact input systems) determine the location of an object touching a surface. Such systems are utilized in a wide variety of applications, including computer graphics, computer aided design, and computer aided manufacturing systems, as well as in restaurants, information kiosks, control panels for complex machinery, and the like. Such a system may be either movable or stationary. These applications often require that the location of the touch or contact be performed with a high degree of accuracy. "Contact input systems" include, in addition to touch input systems digitizers in which a device is responsive to a contact or touch at a specific location or a continuous contact across a surface. Of course, contact input systems are also responsive to a series of such touches or contacts. A contact input system could also comprise an overlay device having a transparent cover layer over a conductive surface, with an operator able to actuate the system by touching the cover layer with a finger. Such systems also can be used with opaque or translucent layers. It will be understood that "contact input system," as used herein, includes such overlay devices, as well as digitizers.

Contact input systems in the past have utilized a variety of approaches for locating an object touching a surface in a contact input system. Typically, the surface in such a system is of a substantially uniform resistivity. Conventional contact input systems have used conductive segments connected to the resistive surface. The segments are usually made of a material which is more conductive than the surface and are often silk-screened onto the surface. Generally, such contact input systems include means for applying an electric potential across the surface in a first direction and then applying an electric potential across the surface in a second direction perpendicular to the first direction. Consequently, when the surface is touched by an object, such as an operator's finger, or a stylus or other means, a unique electric potential between the conductive segments and the object touching the surface exists which corresponds to the location of the object on the surface and the distance between the conductive segments and the object. In addition to providing an x-y location, such systems can be combined with means to determine and provide a z-axis value, which may be based upon pressure, location, or some other parameter.

A common problem with such systems in the past has been the distortion of the electric fields created in the resistive surface by the application of an electric potential. When such fields are distorted (i.e., nonlinear), the accurate determination of the location of an object touching the surface becomes exceedingly difficult, if not impossible. Generally, fairly precise linearity is needed to allow the accurate determination of the location of the object on the surface. In the past, some early systems matched the values of discrete resistors or wires to the resistive value of a resistive surface's thin film. Because precise values of such resistivities are generally not commercially available, matching such values presents difficulties in manufacture and is also a source of error. Consequently, attempts have been made to improve the linearity of the electric fields generated in the surface.

Past attempts to improve the linearity of the electric fields have included the use of diodes disposed along the sides of the surface for controlling the direction of the current flow across the surface. An early example of such an approach can be found in Cameron et al., U.S. Pat. No. 3,449,516, issued Sep. 2, 1980, which is hereby incorporated by reference. This approach presented the disadvantage of the expense of the diode parts, as well as the tendency of the diodes to wear out or become inoperative, thereby rendering the contact input system useless or inaccurate. In addition, securely connecting the diodes to the resistive surface added time and cost to manufacturing operations.

Other early attempts to linearize the electric fields in such surfaces in contact input systems have included the use of discrete resistors connected to the conductive segments disposed on the surface. Typically, such devices used a set of discrete resistors which were electrically isolated from the resistive surface except for connections to the conductive electrodes attached to the surface. In some devices, the resistors were physically located away from the active surface area. Examples of such earlier devices are described in the following patents: Pepper, U.S. Pat. No. 4,198,539, issued Apr. 15, 1980; Hurst, U.S. Pat. No. 3,798,370, issued Mar. 19, 1974; and Talmage, et al, U.S. Pat. No. 4,071,689, issued Jan. 31, 1978. These three patents are hereby incorporated by reference. The use of such additional resistors is undesirable, however, because such resistors constitute additional parts and therefore increase the difficulty and expense in manufacture. Devices with such additional resistors also tend to suffer from decreased durability and reliability.

A similar attempt to linearize the electric fields created in a resistive surface is disclosed in Gibson, et al., U.S. Pat. No. 4,661,655, issued Apr. 28, 1987, which is hereby incorporated by reference. This attempt required the use of a series of electrodes, each with specially selected lengths and shapes, with the conductive electrodes on each side connected to a discrete resistive element made of Nichrome wire. The Nichrome wire was disposed along the edges of the resistive surface. As with discrete resistors, the use of such resistive wires in addition to the surface creates additional difficulty and expense in manufacture and also decreases durability and reliability. This approach also involved problems in determining the appropriate length and shape of the conductive electrodes. Essentially, the electrodes in such devices need to be shaped and arranged to obtain rather precise voltage gradients, with the appropriate gradients dependent on the geometry of the device. Hence, such an approach generally is not easily adapted for manufacturing contact input systems of different shapes and sizes.

More recent attempts at linearizing the electric fields produced in the surface have been based on a series of conductive elements screened onto the resistive surface in a desired pattern to produce an equipotential area on the surface. Early examples of such an approach are disclosed in Pepper, U.S. Pat. No. 4,293,734, issued Oct. 6, 1981, and Pepper, U.S. Pat. No. 4,198,539, issued Apr. 15, 1980, both of which are hereby incorporated by reference. Other touch systems which use this general approach, together with electrodes extending towards the active surface area, include the following: Barrett, et al., U.S. Pat. No. 5,041,701, issued Aug. 20, 1991, and U.S. Pat. No. 4,731,508, issued Mar. 15, 1988 (and its continuation-in-part, U.S. Pat. No. 4,882,957, issued Apr. 18, 1989), both of which are also hereby incorporated by reference. Such devices have avoided the problems created by using discrete resistors and/or resistive wires. Nonetheless, such approaches have involved the use of extremely intricate patterns of conductive segments and/ or elongated electrodes which extend from the edges of the device towards the active area. Such devices can be difficult and expensive to manufacture and, with the more intricate patterns, are not easily adapted for use on resistive surfaces with varying dimensions. Moreover, these approaches require numerous layers of overlapping conductive inks, thus requiring more ink and increasing costs.

Still other attempts have focused on the use of corner electrodes and a perimeter area of a much lower resistivity than the principal useful interior area of the resistive surface to linearize the electric fields generated in the surface. An example of this approach is Nakamura, et al., U.S. Pat. No. 4,649,232, issued Mar. 10, 1987. Such an approach, however, fails to adequately linearize the surface to provide a suitably accurate contact input system without undue expense and difficulty in manufacture.

Accordingly, it is an object of the invention to provide an inexpensive and easily manufactured device for linearizing the electric fields in a surface for use in a contact input system.

It is a further object of the invention to provide a more reliable and durable device for linearizing the electric fields in a surface for us in a contact input system. It is a still further object of the invention to provide a surface for use in a more accurate and reliable contact input system.

It is a still further object of the invention to provide a reliable and accurate contact input system with a surface which is inexpensive and is easily manufactured.

It is a still further object of the invention to provide a reliable and accurate contact input system which does not require the use of discrete resistors or conductive extensions of specially selected lengths and shapes.

It is yet another object of the invention to provide a simpler, less complicated pattern of conductive segments which can be easily adapted for use with contact input systems of varying dimensions.

SUMMARY OF THE INVENTION

This invention uses a series of conductive segments along the perimeter of an active area on a resistive surface, with the segments following an inwardly disposed path. According to the invention, there are gaps or spaces, of selectively determined shape and size, between the adjacent conductive segments to provide appropriate resistances. The invention utilizes the progressively inward displacement of the conductive segments to linerize the electric fields existing in the active area of the surface when an electrical potential is applied across the surface. In a preferred embodiment of the invention, a substantially rectangular area with four sides and four corners is used, with each side having a pattern of conductive segments which generally follow a parabolic shape, with the vertex of the parabola located approximately near the midpoint of each side. According to this embodiment of the invention, the conductive segments on the left of the midpoint are generally Z-shaped and arranged so that at least a portion of the top portion of each segment overlaps a bottom portion of the adjacent Z-shaped segment. To the right of each midpoint, the segments generally follow an inverted Z-shape, with the top portion of each segment overlapping the bottom portion of the adjacent segment. In this embodiment, a T-shaped midpoint segment is used at the midpoint of each side of the resistive surface. This pattern of conductive segments thus avoids the use of conductive extensions and the use of discrete resistors or wires. Moreover, this pattern involves less layers of conductive segments than conventional devices and thus requires less ink to manufacture.

BRIEF DESCRIPTION OF THE FIGURES

FIGS. 3A, 3B, and 3C are top views of hypothetical edge linearization devices with continuous linearly resistive edge elements.

FIGS. 3D and 3E are detailed views of the resistive gap or space geometry between adjacent conductive elements on a hypothetical edge linearization device.

FIG. 4 illustrates a contact input system which includes circuitry for determining the location of a contact on a resistive surface made in accordance with the present invention.

FIG. 5 is a schematic diagram of the circuitry 39 in FIG. 4 in accordance with the present invention.

DESCRIPTION OF THE INVENTION

The present invention relates to an edge linearization device adapted for use in a contact input system. Contact input systems usually are useful for interactive operation with computer systems. In such computer systems, an operator often uses an object, such as a finger, pencil, stylus, or other means, to contact a surface. Such systems often include means for determining the location of contact between an object and the surface.

Figure 1:
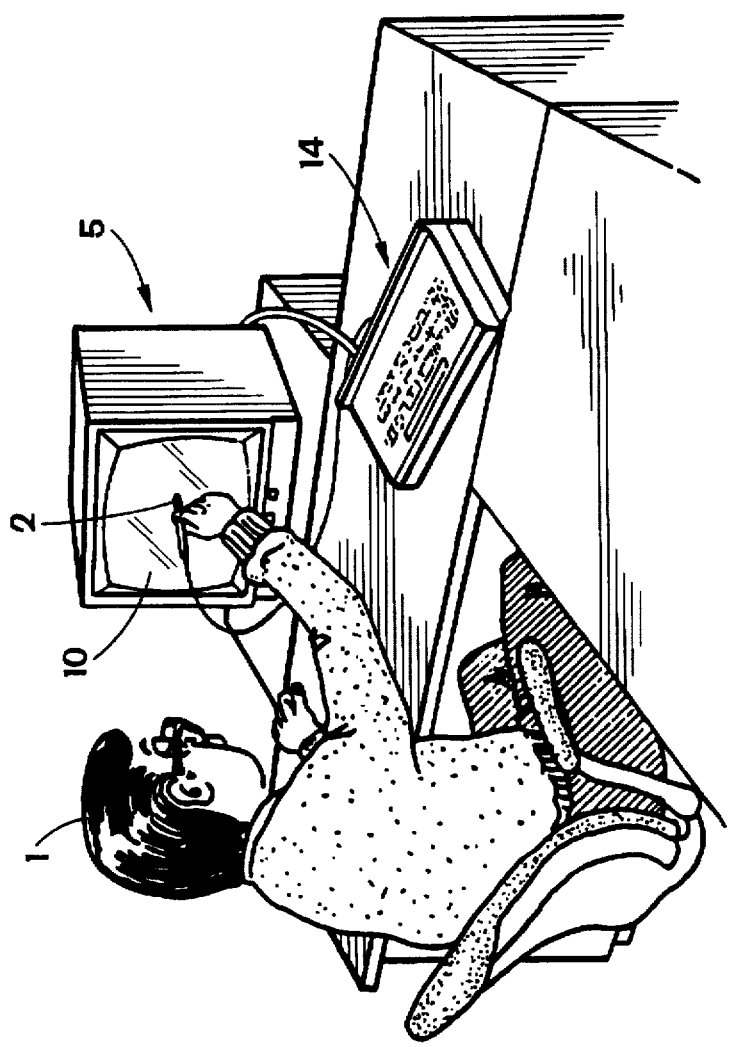
FIG. 1 is an illustration of an operator using a contact input system having a resistive surface in accordance with the invention.

In FIG. 1, an operator 1 is shown. Operator 1 is able to selectively touch a surface 10 in a contact input system with an object 2, such as a pencil, finger, stylus or other similar means. Surface 10 of the contact input system is removably attached to a CRT of a computer system 5, although the surface 10 can be formed onto the CRT screen of a computer 5. As is well known to those skilled in the art, surface 10 can be the resistive surface 10 itself or a cover sheet located over the surface 10. The use of such cover sheets is well known and an early example of such a device is described in Hurst et al., U.S. Pat. No. 3,911,215, issued Oct. 7, 1975, which is hereby incorporated by reference. For convenience, the following description refers to contacts with the resistive surface, but this discussion will be understood to include those devices which include cover sheets as well as those which do not.

Figure 2A:
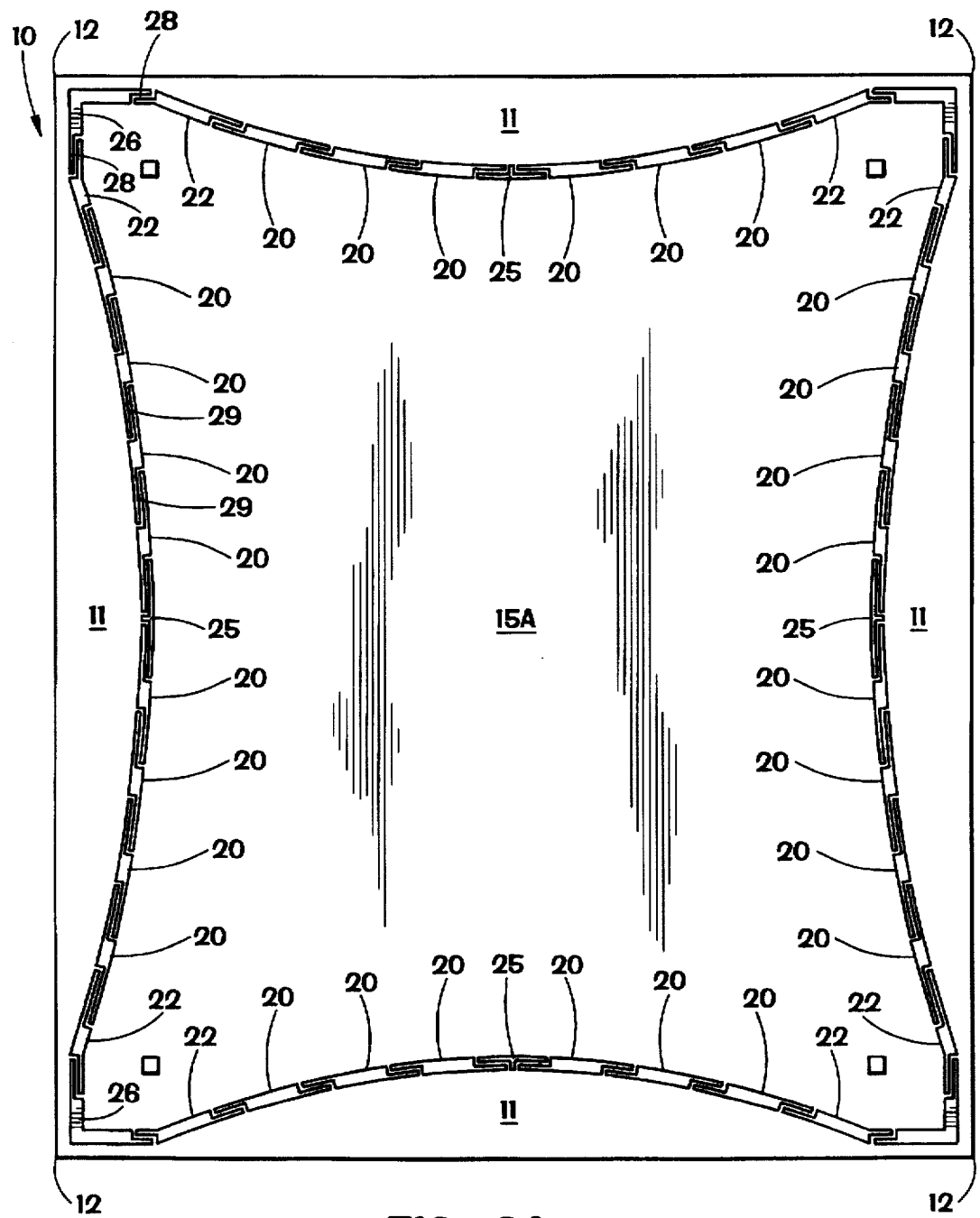
FIG. 2A is a top view of the edge linearization device in accordance with the invention.

In FIG. 2A, a surface 10 having a substantially uniform resistance is shown. Surface 10 defines a substantially rectangular area 15 having four sides 11 and four corners 12. The substantially rectangular area 15 is adapted for use with a CRT screen of a computer which is generally rectangular in shape and is slightly rounded at its corners. Surface 10 can, of course, define an area with perimeter configurations other than a rectangle and may be planar, cylindrical, or complex in two dimensions (i.e., shaped like a CRT). Such a surface 10 is known to those skilled in the art and is commercially available in a variety of resistive values from various companies. For example, a suitable surface 10 can be obtained from the Donnelly Company of Holland, Mich. Such a surface 10 essentially comprises a substrate which typically consists of plastic, glass, or some other suitable material and a resistive coating of a material which is typically a semiconducting metal oxide, such as indium-tin oxide, although other materials, such as tin oxide, tin antimony oxide, or indium oxide, could be used. Any such coating is to be understood as a "thin film." In addition, similar "thick" films, as well as opaque films, could be used. For best results, we prefer a surface 10 having a substantially uniform resistivity of 200–1000 ohms per square. However, a wide variety of resistive values can easily be used to achieve acceptable results.

Disposed in contact with surface 10 is a plurality of conductive segments 20. Segments 20 are electrically connected to surface 10 and can be placed in contact with surface 10 through a variety of means. Although segments 20 need not lie on a top face of surface 10, for best results, we prefer to dispose segments 20 on a top face of surface 10. Later references to segments 20 disposed "on" surface 10 will be understood to include any manner in which segments 20 are placed in contact with surface 10. Segments 20 are selectively spaced apart from each other. For best results, we prefer silk-screening segments 20 onto surface 10 with standard lithographic techniques, although a variety of methods are available which are known to those skilled in the art. Silk-screening segments 20 onto surface 10 minimizes the number of steps required to manufacture the invention by producing segments 20 in the desired pattern, as described in more detail below. Silk-screening also allows close control of the process to yield configurations of segments 20 within tight tolerances. As will be obvious to those skilled in the art, other configurations of segments 20 easily can be silk-screened onto surface 10.

As can be seen from FIG. 2A, the segments 20 located on each side 11 of surface 10 are located in a manner so that the innermost extent of each segment 20 is greater than the adjacent segment 20 closer to the corners 12 of area 15. On each side of area 15, there is at least one center-most T-shaped segment 25 which extends further into area 15 than the segments 20 on a given side 11 of area 15. As shown in FIG. 2A, we prefer to use generally T-shaped segments 25 located at approximately the midpoint of each side of area 15.

As is shown in FIG. 2A, the segments 20 follow a path which extends into area 15 in a progressively more inwardly disposed manner, with a T-shaped segment 25 most inwardly disposed into area 15. To obtain best results in terms of greater linearity of the substantially orthogonal electric fields created in surface 10, we prefer that the segments 20 be generally Z-shaped to the left of the midpoint segment 25 (as one looks towards the active area 15), with the segments 20 to the right of the midpoint segment 25 generally an inverted Z-shape as shown in FIG. 2A (i.e., shaped generally like " "). We prefer to have the segments 20, 25 made of a silver ink which is commercially available and well known to those skilled in the art and which is easily silk-screened onto surface 10. Such an ink is commercially available from Acheson of Port Huron, Mich. A variety of other conductive materials, such as gold and other metals, could be used. Also for best results, we prefer that the progressively inward displacement of the extensions of segments 20 into area 15 approximate or follow the shape of a parabola, with the T-shaped segment 25 located approximately at the location of the vertex of the parabola formed by the path of segments 20.

As shown in FIG. 2A, the top bar of the midpoint segment 25 overlaps the bottom bars of the adjacent segments 20. In turn, the top bars of segments 20 overlap the bottom bars of the conductive segments 20 adjacent them, and so forth. As shown in FIG. 2A, this invention does not involve more than two overlapping layers of conductive segments. This represents a significant reduction in complexity and also in the amount of conductive ink required.

Also disposed on the top of surface 10 are corner segments 22, as is shown in FIG. 2A. Corner segments 22 are positioned near the corners 12 of area 15 and are made of the same material as segments 20. We prefer that corner segments 22 also be silk-screened onto surface 10. Adjacent and between corner segments 22 is a corner connector 26, which can be connected electrically to various electric circuitry. As noted above with respect to segments 20, corner segments 22 and corner connectors 26 are preferably conductive inks which are silk-screened onto the resistive surface 10.

As shown in FIG. 2A, there are gaps or spaces 28 between a corner segment 22 and a corner connector 26. These gaps 28, via the resistance of the surface 10, act to create a resistance $R_1$ between corner connector 26 and corner segments 22. Spaces 29 between segments 20 create, also via the resistance of the surface 10, a resistance $R_2$ between segments 20. The values of $R_1$ and $R_2$ are a function of the geometry of gaps or spaces 28, 29 between the adjacent conductive elements; in turn, the spaces 28, 29 are a function of the pattern of the segments 20, 22, and 25. The following discussion explains how the appropriate geometry of the spaces 28, 29 is determined.

Figure 3E:
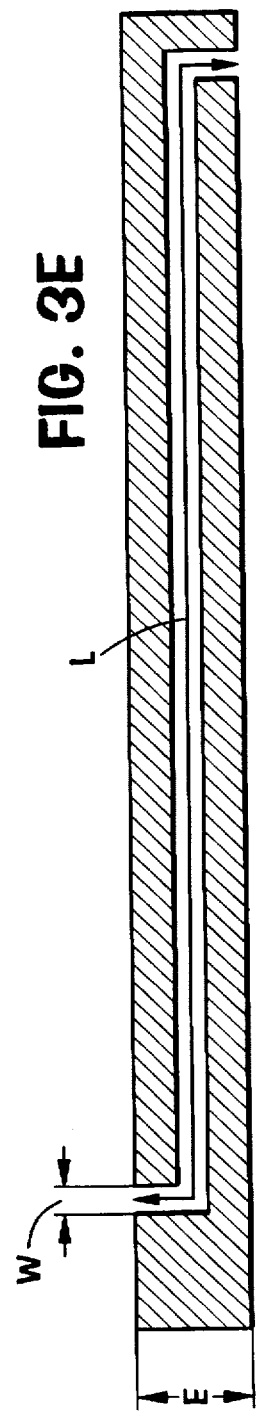

We investigated developing an apparatus in which its edges would serve as effective sources for current flowing perpendicular to the edges and, concurrently or alternately, remain non-invasive with respect to currents flowing parallel to the edges. One approach would be through the use of linearly resistive elements along each edge, as is shown in FIG. 3A. Devices e, f, g, and h in FIG. 3A are such elements with a resistance per unit length which remains constant. The width of devices, e, f, g, and h can be considered insignificant in relation to the apparatus. If an equipotential line is established along element e, and another along element f, a constant current would flow perpendicular to these elements through resistive elements g, and h, as well as through surface 10, thereby establishing an identical voltage gradient in surface 10 and in the edge elements.

Unfortunately, it is not as easy to create an equipotential across a resistive element as it is with a conductive element. However, if the resistance of the edge elements is kept low with respect to surface 10, a good approximation of an equipotential edge can be created. Furthermore, the error caused by the resistance of these elements can be analyzed.

Given an apparatus as shown in FIG. 3B, of dimensions 2 v by 2 u, using the coordinate system shown, i.e., with the origin at the center, we can define the following: the resistive elements e' and f', have a resistance of R, end to end. The resistive surface 10 has a sheet resistivity p. The electric potential V is applied at the top corners with respect to the lower corners. If the resistive elements e' and f' were equipotential edges, then a current would flow through surface 10 with a constant current density i. This current is supplied through resistive element e'. In fact, this current can be described as a function of the x coordinate. In the first quadrant, this current I(x) is defined as the current flowing towards the center at the point (x,u) by the equation:

$$I(x) = \int_o^x i\,dx = ix.$$

The actual potential at every point along element e' can be further computed. If $V_a$ is defined as the potential between point (O,O) and (O,u), and A is defined as the aspect ratio A=u/v, then the voltage drop from point (O,u) to point (x,u) can be determined from the equation:

$$E(x) = (RV_a/4pA)(x^2).$$

By selecting appropriate values of R and p, this voltage drop can be made extremely small; however, this would require using a very low value for R. This would in turn cause the apparatus to consume huge amounts of power and create additional problems. Therefore, this voltage drop can be compensated for and we can avoid using such amounts of power. In fact, it can be shown that E(x) is equivalent to the voltage drop in surface 10 caused by the current i flowing through a distance $d(x) = (R/4pA)(x^2)$. Therefore, if surface 10 is extended by pulling back element e' by a distance d(x), then the voltage drop between the point (x,u+d(x)) and (O,u) is matched by an equivalent drop between (x,u+d(x)) and (x,u), thereby creating an equipotential line along y=u, as intended, and establishing that i is constant. The result is that resistive element e" becomes parabolic in shape, as is shown in FIG. 3C. However, it must still be a linear resistor with respect to the x coordinate. Element f" is a symmetrical reflection of element e" and likewise is parabolic. A similar approach can derive the shape of elements g" and h", by substituting coordinates appropriately and replacing A by 1/A. FIG. 3C is an illustration of such a device.

Referring now to FIG. 3C, the parabolic path of the edge devices e", f", g", and h" now causes an additional problem. It is desirable to define an active area within the apparatus the original area of size 2 v×2 u. The total voltage gradient across this area is not the same as the voltage being applied to the corners of the apparatus. Consequently, it is necessary to add additional resistance at each corners so that the voltage in the non-invasive edge elements corresponds to the voltage in the active area. It is also necessary to include the additional resistance in the active edge in the computations. By solving simultaneous current equations, the additional resistance between the voltage source and the edge elements can be determined. $R_1$ is the resistance for elements e" and f" and $R_2$ is the resistance for elements g" and h", as described in the following equations:

$$R_1 = Ap(D^2/0.5 - D);$$

and $$R_2 = (p/A)(D^2/0.5 - D),$$

where $$D = (R/4pA).$$

Although this approach can be used to create a useful apparatus, such a device has proven extremely difficult to manufacture. The actual geometry of the edge devices depends on the ratio of R and p and the value of A. The aspect ratio A is always known at design time, but the actual values of R and p can vary significantly in manufacturing. In order to manufacture a resistive surface of this type with a fixed geometry shown in FIG. 3C, the value of p would have to be measured for each unit and an appropriate material would have to be used to create the linear resistive elements with the exact ratio of R to p that was used to generate the geometry of the apparatus. In practice, we have found that this approach is not currently feasible to create a resistive surface 10 with this degree of accuracy and predictability.

An approximation of continuous resistive edge elements e", f", g", and h" around an active area on surface 10 provides advantages, however, because the discrete approximation is generally practical and produces an apparatus which is both easy to manufacture and also accurate. Given a resistive surface with unit resistance R, an approximation of a continuous resistive edge element could be provided by a serial network of n resistors, each with a resistive value of (R/n). If the value of n is chosen appropriately, this network will approximate the behavior of continuous parabolic resistive elements disposed around the perimeter of surface 10 and defining an active area within the perimeter. In order to operate like continuous resistive elements, such a resistor network must be connected to surface 10 in a similar manner. Given n resistor channels (described below in more detail), plus the two resistor channels adjacent to corner connectors 26, sums to a total of (n+2) such resistor channels on each side. Each of these n points has a resistance to the end of the network, R(i). The point with resistance R(i) preferably should make contact with surface 10 at the same point where the parabolic continuous resistive element, if used, would have had a resistance to the endpoint of R(i).

Since it would be difficult to connect these parts to a device in the shape of a parabola, the invention instead uses the pattern of the conductive segments to form resistive spaces or channels which replace the hypothetical continuous resistor, as can be seen in FIG. 2A. The conductive segments 20, 22, and 25 in FIG. 2A generally follow the same path as the hypothetical continuous parabolic elements e", f", g", and h" in FIG. 3C. This way, the segments 20, 22 are pulled back from the active area 15 enough so that the voltage drop creates an equal potential at the edge of the active area 15 when an electric potential is applied across surface 10. As noted above, the segments 20, 22, and 25 can be produced with a conductive ink, which need not have the same precision as a resistive ink. The actual geometry of the device 10 can be determined at design time as further detailed below, with the values of the resistors determined after measuring the resistivity of the resistive surface 10. These resistors can be measured prior to assembly rather than being manufactured to a specific value. Since the conductors 20, 22, and 25 can be printed in conductive ink, their geometry can be easily controlled to a tight tolerance. Moreover, the invention avoids the need for extended conductive segments or electrodes protruding into the active area from the edge; because such segments or electrodes can become disconnected from the resistive network formed by the conductive segments, the invention provides increased durability and reliability over other designs.

In order to produce contact input systems with resistive surfaces, it is useful to use an edge linearization pattern which can be easily adapted to devices of various shapes and can be used without having to measure the unit resistivity of each resistive surface. Because the unit resistance in a single resistive surface is generally quite uniform, the invention utilizes an "integrated resistor". This resistor was designed so that its resistive value is determined by and directly proportional to the unit resistivity of the resistive surface 10. The following discussion explains the analysis for determining the appropriate shape and size of gaps 28, 29.

Referring to FIG. 3D, given a strip of a resistive material with sheet resistivity rho (denoted p), such as surface 10, between two parallel conductive elements with length L and width W, the resistance between the conductors is equal to (pW/L). This information allows the use of resistors between the conductive segments 20 such that, as the value of p changes, the value of the resistors changes proportionately. Since the geometry of such a device depends only on the ratio of R to p, the geometry of the conductive segments 20 need not change in response to differences in the resistivity p of the surface 10. Also, such a device can be manufactured by laying a single conductive layer in an appropriate desired pattern of conductive segments 20, 22, and 25 onto a single resistive layer, such as surface 10.

Figure 2B:
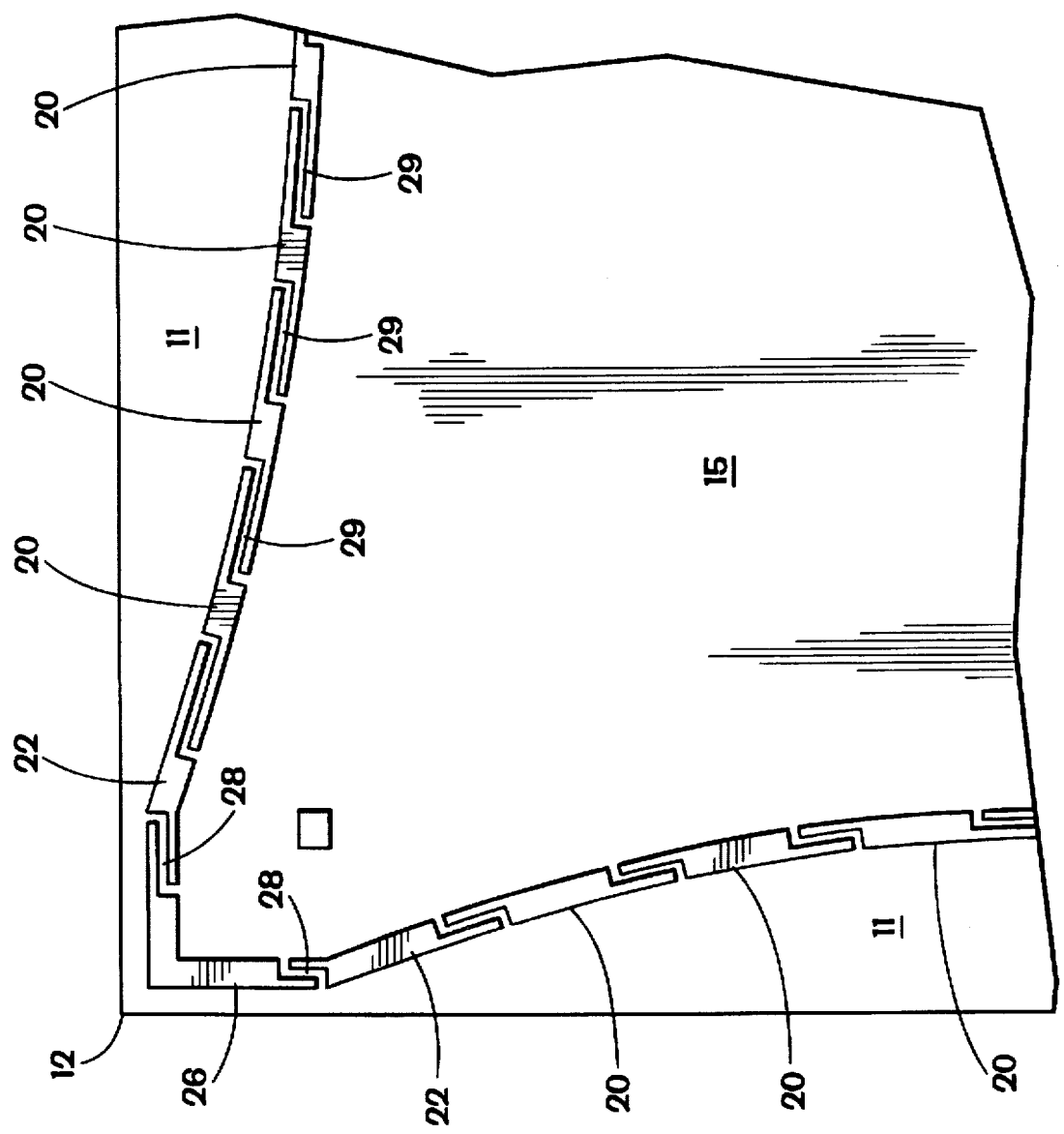
FIG. 2B is a top view showing in detail a corner connector 26, corner segments 22, and segment 20, as well as spaces 28, 29.

In practice, we have obtained best results when the ratio of W to L for such resistors is very low. Referring back to FIG. 2A, the twisted gaps or spaced 28, 29 between the facing edges of two adjacent conductive elements, such as segments 20 and corner segments 22, placed on surface 10. FIG. 2B shows the twisted gaps or spaces 28, 29 between adjacent conductive elements 20, 22, and 26. Such twists can be defined by the projections or bars extending laterally from one segment 20 toward an adjacent segment 20 and overlapping a bottom arm or bar of the adjacent segment 20, with the edges of the projection and the recess maintained a selected distance apart. As is seen in FIG. 2B, the length of the twisted gaps 28, 29 can be longer than the length of the base portions of the two adjacent segments 20 transverse to the edge of surface 10; therefore the length of the segments 20 needed to create such a gap 29 does not need to protrude extensively into area 15, enabling the active portion of the area 15 to be kept relatively large. The current flowing across spaces 28, 29 is subject to resistance from the resistivity p of surface 10. A number of these integrated resistors have been produced and can be characterized, so that it is possible to predict the value of a resistor (in terms of p) by knowing its dimensions. Consequently, it is possible to select the desired resistive values by selectively determining the dimensions of spaces 28, 29.

Spaces 28, 29, once selected for a desired application for values of $R_1$ and $R_2$, are easily created by selectively disposing segments 20, corner segments 22, and corner connectors 26 on surface 10. Selectively silk-screening segments 20, corner segments 22, and corner connectors 26 onto surface 10 according to a preselected geometry, creates spaces 28, 29 and provides the desired resistive values. Because segments 20, corner segments 22, and corner connectors 26 can be silk-screened onto surface 10, their pattern and dimensions can be controlled to tight tolerances. By using appropriate patterns and dimensions for spaces 28, 29, the use of individual resistors or Nichrome wire connected to segments 20, corner segments 22, or corner connectors 26, located either on surface 10 or located off surface 10, is avoided. The resistivities of surface 10 resulting from spaces 28, 29 avoid the need for such resistive elements connected between segments 20, corner segments 22, and corner connectors 26, instead using the resistivity p of surface 10 to create the desired resistivities.

The appropriate geometry of segments 20, corner segments 22, and corner connectors 26 are a function of the combination of the resistance of surface 10, the conductivity of segments 20 and corner segments 22, the number of segments 20 on each side 11 of surface 10, along with corner segments 22, and the size of area 15. The appropriate pattern and dimensions of segments 20, corner segments 22, and corner connectors 26 have been heuristically determined, but we have found that this pattern can be used with surfaces 10 of various sizes with relatively few significant changes. Minimizing the spacing between segments 20 creates a lower resistivity; decreasing the value of the resistivity leads to greater power consumption, which may be undesirable. We have found that the prevent invention minimize the degree to which the segments extend in area 15, thereby maximizing the amount of the active area of surface 10.

Figure 2C:
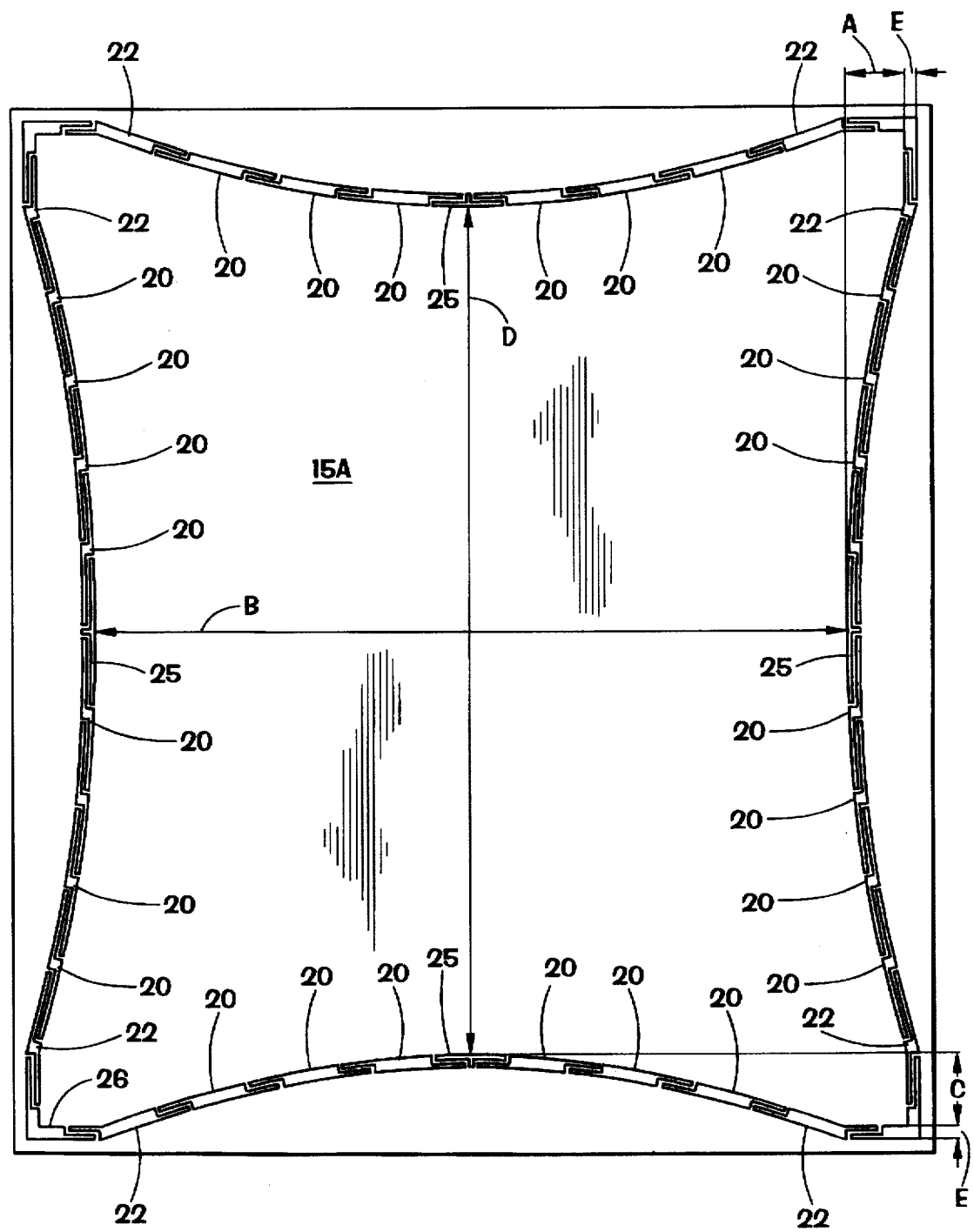
FIG. 2C is a top view of an edge linearization device according to the present invention which describes certain dimensions.

Referring now to FIG. 2C, a first specific embodiment of the invention is shown. Generally, the dimensions of a touch sensor's active area 15 are provided as design criteria. In addition, it is fairly common to obtain or set the maximum outer dimensions of the touch sensor surface 10. Referring to FIG. 2C, we can let the active area 15 of the sensor 12 be defined by dimensions B, D. At the same time, the outer dimensions of the surface 10 can be defined as (2E+2A+B), (2E+2C+D). In this formula, E represents the total width of the overlapping conductive segments 20 and the resistive gap 29 therebetween (as is shown more clearly in FIG. 3E), A represents the maximum deflection (into the active area 15) of the parabolic path of the conductive segments 20 along dimension B (i.e., the x-axis), and C represents the maximum deflection (into the active area 15) of the parabolic path of the conductive segments 20 along dimension D (i.e., the y-axis). The deflection into the active area 15 of the parabolic path can be defined as P(X) and P(Y) along the X, Y dimensions of the area 15, respectively, by the following formulas:

$$P(X) = \left(1 - \left(\frac{X}{\left(\frac{B}{2}\right)}\right)^2\right) \times C$$

and $$P(Y) = \left(1 - \left(\frac{Y}{\left(\frac{D}{2}\right)}\right)^2\right) \times A.$$

As shown in FIG. 2C, the active area 15 is defined by symmetric parabolas of conductive segments 20 which extend towards the inner, active area 15 from the edges.

We have found that we can choose $N_X$ and $N_Y$ as the number of resistor gaps 29 along each edge of the surface 10. Generally, we have found that best results (in terms of linearity of electric fields across area 15) are achieved when both $N_X$ and $N_Y$ are 10 or higher. We have also found, however, that $N_X$ and $N_Y$ can be both higher and lower than 10 without substantially decreasing performance. Using the relationship p×(W/L) as noted above to describe the resistivity of a resistive gap 29 of width W and length L, it can be seen that the resistance of each of the $N_X$, $N_Y$ resistive gaps 29, respectively, is:

$$\text{For } N_X, \frac{W}{L} = \left[\frac{8 \times C}{N_X \times B}\right], \text{ and}$$

$$\text{For } N_Y, \frac{W}{L} = \left[\frac{8 \times A}{N_Y \times D}\right].$$

In the specific embodiment shown in FIG. 2C, there are corner segments 22 located between the corner connectors 26 and the conductive segments 20 along the edges joining at corner connectors 26. In this embodiment, there are corner gaps 28 on either side of the corner connectors 26. The size of the corner gap 28 on the x-axis can be determined in accordance with the following formula:

$$\frac{W}{L} = \frac{(4 \times C) + D}{\left(\frac{D \times B^2}{8 \times C \times A}\right) - (2 \times B)}$$

The size of the corner gap 28 on the y-axis can be determined in accordance with the following formula:

$$\frac{W}{L} = \frac{(4 \times A) + B}{\left(\frac{B \times D^2}{8 \times C \times A}\right) - (2 \times D)}$$

A touch sensor made in accordance with the foregoing approach, by way of example, had the following dimensions:

| | |
|---|---|
| A | 0.510 inches |
| B | 8.840 inches |
| C | 0.255 inches |
| D | 6.750 inches |
| E | 0.070 inches |
| W | 0.020 inches |
| $N_X$ | 10 |
| $N_Y$ | 14 |
| $L_X$ | 0.823 inches |
| $L_Y$ | 0.440 inches |
| $L_{X\ CORNER}$ | 1.197 inches |
| $L_{Y\ CORNER}$ | 0.652 inches, where |
| $L_X =$ | the length of the resistive gaps 29 between segments 20 along the x-axis of surface 10 (i.e., the top and bottom edges of FIG. 2C); |
| $L_Y =$ | the length of the resistive gaps 29 between segments 20 along the y-axis of surface 10 (i.e., the left and right edges of FIG. 2C); |
| $L_{X\ CORNER} =$ | the length of the resistive gap 28 between corner connector 26 and the adjacent segments 22 along the x-axis of surface 10 (i.e., the top and bottom edges of FIG. 2C); and |
| $L_{Y\ CORNER} =$ | the length of the resistive gap 28 between corner connector 26 and the adjacent segments 22 along the y-axis of surface 10 (i.e., the left and right edges of FIG. 2C). |

An alternative embodiment of the invention can be made without segments 22 and corner gaps 28. We have found that that we can modify the dimensions of the corner connectors 26 and change the dimensions of the resistive gaps 29 immediately adjacent the modified corner connectors 26. In this alternative embodiment, shown in FIG. 2D, the modified dimensions of the outermost of the resistive channels 29 along the top and bottom edges of FIG. 2D (i.e., the x-axis) can be determined in accordance with the following:

$$\frac{W}{L} = \frac{(4 \times C) + D}{\left(\frac{D \times B^2}{8 \times C \times A}\right) - (2 \times B)} + \frac{8 \times C}{N_x \times B}$$

Figure 2D:
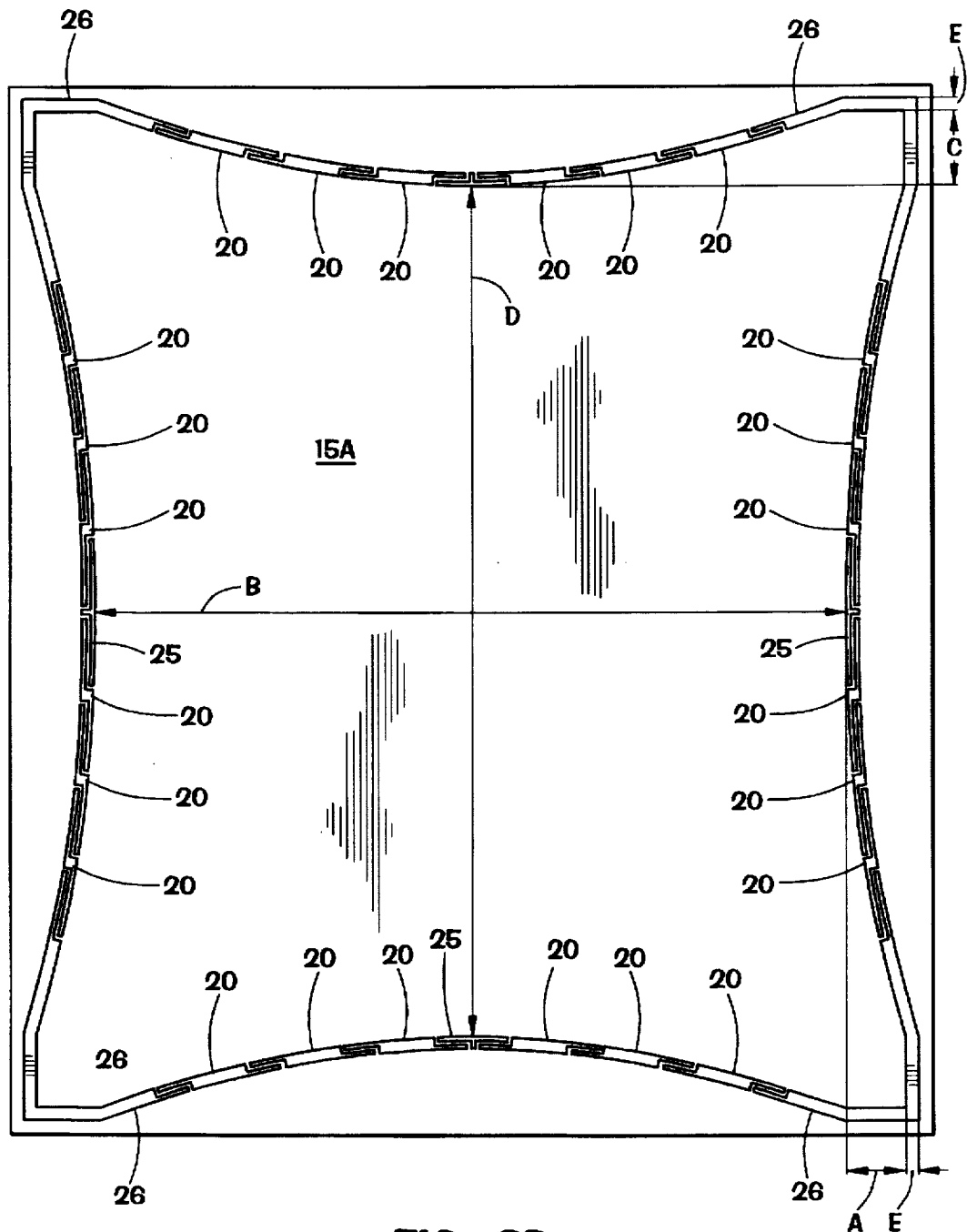
FIG. 2D is a top view of an alternative embodiment of an edge linearization device according to the present invention which shows certain dimensions.

Similarly, the modified dimensions of the outermost of the resistive channels 29 along the left and right edges of the surface 10 in FIG. 2D (i.e., the y-axis) can be determined as follows:

$$\frac{W}{L} = \frac{(4 \times A) + B}{\left(\frac{B \times D^2}{8 \times C \times A}\right) - (2 \times D)} + \frac{8 \times A}{N_y \times D}$$

A specific touch sensor made in accordance with this alternative embodiment (not shown) had the following dimensions:

| | |
|---|---|
| A | 0.510 inches |
| B | 8.840 inches |
| C | 0.255 inches |
| D | 6.750 inches |
| E | 0.070 inches |
| W | 0.020 inches |
| $N_X$ | 10 |
| $N_Y$ | 14 |
| $L_X$ | 0.823 inches |
| $L_Y$ | 0.440 inches |
| $L_{X\ OUTERMOST}$ | 0.488 inches |
| $L_{Y\ OUTERMOST}$ | 0.263 inches, where |
| $L_X =$ | the length of the resistive gaps 29 between segments 20 along the x-axis of surface 10 (such as the top and bottom edges of FIG. 2C); |
| $L_Y =$ | the length of the resistive gaps 29 between segments 20 along the y-axis of surface 10 (such as the left and right edges of FIG. 2C); |
| $L_{X\ OUTERMOST} =$ | the length of the outermost resistive gaps 29 between the corner connector 26 and the adjacent segments 22 along the x-axis of surface 10 (such as the top and bottom edges of FIG. 2D); and |
| $L_{Y\ OUTERMOST} =$ | the length of the outermost resistive gaps 29 between the corner connector 26 and the adjacent segments 22 along the y-axis of surface 10 (such as the left and right edges of FIG. 2D). |

A touch sensor made in accordance with the foregoing was found to work well and provide high linearity across the active area 15. As the foregoing demonstrates, a touch sensor made in accordance with the invention has numerous advantages, including its easy adaptability to surfaces with different resistivity and surfaces with different dimensions.

FIG. 4 describes a contact input system 30, which includes surface 10, segments 20, corner segments 22, and corner connectors 26. (Generally, the elements shown in the figures are given the same number throughout all the figures, except as otherwise noted.) In FIG. 4, surface 10 is substantially rectangular in shape; as previously noted, however, surface 10 need not be this shape, but could be a variety of geometric shapes. Moreover, although surface 10 is shown as planar in FIG. 4, surface 10 could easily be contoured; i.e., non-planar. Contact input system 30 also includes a movable object 2, such as a stylus, for touching surface 10. As noted above, object 2 can also be a finger, pen, pencil, or other device used by the operator to touch the surface 10. Object 2 can be used by an operator to touch surface 10 of contact input system 30 at a chosen location of area 15.

Contact input system 30 also includes electric circuit 39 for selectively applying an electric potential across segments 20 and corner segments 22 on a first side 11A of area 15 and segments 20 and corner segments 22 on a second side 11B of area 15, then selectively applying an electric potential across segments 20 and corner segments 22 on a third side 11C of area 15 and segments 20 and corner segments 22 on a fourth side 11D of area 15. As shown in FIG. 4, electric circuit 39 is electrically connected to corner connectors 26 on sides 11C and 11B. The electric potential is selectively applied to sides 11A, 11B and sides 11C, 11D in an alternating fashion. Although FIG. 4 and FIG. 5 disclose the use of electric circuit 39 to alternatively apply a selected electric potential across surface 10, it will be obvious to those skilled in the art that an electric potential can be selectively applied across surface 10 in other ways. For example, an electric potential could be applied by simultaneously applying a first electric potential between side 11A and side 11B and a second electric potential between side 11C and side 11D, wherein said first electric potential and said second electric potential are alternating current signals with different frequencies.

We have found that an electric potential applied across sides 11A, 11B and sides 11C, 11D at a rate of about 200 times per second obtains best results. It will be obvious to those skilled in the art, however, to utilize various rates depending on various factors, such as the particular application of the contact input system and the dimensions of the surface of the contact input system.

Alternating the application of an electric potential across sides 11A, 11B and sides 11C, 11D is easily achieved with electric circuit 39 show in FIG. 5. Electric circuit 39 for selectively applying an electric potential across surface 10 and for determining the location of movable object 2 when movable object 2 is touching surface 10 essentially consists of: microcontroller system 50, comparator 53, drivers 55, 56, 57, 58, analog to digital (A/D) converter 60, regulator 65, switches 70, 71, buffer amplifier 75, and switch 80. As shown in detail in FIG. 5 and explained in more detail below, microcontroller system 50 is electrically connected with comparator 53, A/D converter 60, and to switches 70, 71 and to switch 80. Regulator 65 is connected with switches 70, 71 and with driver 58, while drivers 55, 56, 57 are connected with switches 70, 71, respectively. Switch 80 is connected with buffer amplifier 75 which is connected with comparator 53 and A/D converter 60. Of course, substantially the same results may be obtained with other means without departing from the scope and spirit of the present invention.

The contact input system and its circuitry typically operates by setting a "high" electric potential (usually +5 V) on a first corner 12A of surface 10 and a "low" voltage level on a second corner 12B which is diagonal to the first. The voltage levels at the other two corners 12C, 12D of surface 10 are selectively switched so that in one state the third corner 12C has a high voltage level while the fourth corner 12D has a low level and in a second state the third corner 12C has a low voltage level and the fourth corner 12D has a high level.

A probe 1 selectively contacts surface 10 of the contact input system and measures a voltage or current level. This level (voltage or current) is passed through buffer amplifier 75 and into A/D converter 60 and comparator 53. In this circuit, comparator 53 compares the voltage level and, if that level is less than +5 V, generates a high logic output signal which indicates the detection of a touch. Upon receiving such a "touch detect" signal, the firmware within microcontroller 50 obtains the first ordinate value from A/D converter 60. Microcontroller 50 then generates switching signals to switches 70, 71; when switches 70, 71 are switched, the voltage levels of corners three and four are switched so that an electric current flows perpendicular to the previous direction in the first state. Microcontroller 50 then obtains from A/D converter 60 the second ordinate which corresponds to the location of probe 2 on surface 10.

Microcontroller 50 switches the voltage levels at the corners of surface 10 while a touch detect signal is generated by comparator 53. Microcontroller 50 does not switch the voltage levels until after the conversion by A/D converter 60 is completed. While comparator 53 continues to provide a touch detect signal, microcontroller 50 continues to switch the voltage levels and, if the touch detect signal exists for a long enough period, obtains multiple measurements of the ordinates from A/D converter 60.

Microcontroller 50 also uses firmware which filters the data received. The filtering algorithm smooths the data received. The filtering algorithm smooths the data points. In addition, microcontroller 50 converts the desired output data into a desired format. We have found that different formats may be desirable for different applications. It will be obvious to those skilled in the art to program microcontroller 50 to provide output data in a desired format.

Microcontroller 50 also provides an impedance control signal to switch 80. The touch detect signal from comparator 53 is tested by microcontroller 50. If the impedance in the touch detect signal remains fairly high, microcontroller 50 closes switch 80 to prevent the system from treating the situation as a "touch" or "hit." When the impedance in the touch detect signal is low, indicating a strong touch on surface 10, the change in impedance from the previous state (i.e., the absence of a touch) will be marked, and microcontroller 50 will not close switch 80. Thus, the impedance control signal from microcontroller 50 operates to selectively enable the system. Depending upon the desired sensitivity level, the firmware can be programmed to selectively determine when microcontroller 50 will close switch 80 via an impedance control signal. The other components shown in FIG. 5 are of types which are generally known. Regulator 65 is used to provide a steady signal of +5 V, buffer amplifier 75 is used to boost the signal received from probe 2, and drivers 55, 56, 57, and 58 are used to ensure that surface 10 is provided enough current. Switches 70 and 71 can be multiplexers of a type which is well known and commercially available, such as those available from Motorola of Austin, Tex.

It should also be noted that the functions performed by microcontroller 50 could be performed by electric hardware components. Of course, the use of such hardware components would be obvious to one skilled in the art.

The foregoing disclosure and description of the invention are illustrative and explanatory thereof and it will be understood by those skilled in the art that various changes in size, shape, and materials, as well as in the details of the illustrated constructions may be made within the scope of the following claims without departing from the spirit of the invention.

What is claimed is:

1. An edge linearization device which comprises:

a surface having a substantially uniform resistivity and defining a substantially rectangular area with four sides and four corners;

a plurality of first conductive segments on each side of said surface, wherein said first conductive segments are located on and electrically connected to said surface and wherein said first conductive segments follow a path that is inwardly disposed into the area of said surface from the sides;

a generally T-shaped conductive segment on each side of said surface, wherein said T-shaped segment is located substantially at the midpoint of each side, wherein said first conductive segments to the left of said T-shaped segment on each side are generally z-shaped, having a center, a top bar portion and a bottom bar portion, and said first conductive segments to the left of said T-shaped segment are located so that at least a portion of the top bar of each said first conductive segments overlaps at least a portion of the bottom bar of the adjacent one of said first conductive segments, and wherein said first conductive segments to the right of said T-shaped segment on each side are generally of an inverted z-shape and have a center, a top bar portion and a bottom bar portion, and said first conductive segments to the right of the T-shaped segment are located so that at least a portion of the top bar of each said first conductive segments, overlaps at least a portion of the bottom bar of the adjacent one of said first conductive segments;

a plurality of conductive corner connectors located on and electrically connected to said resistive surface, wherein said corner connectors form corners between adjoining sides; and wherein the resistivity of said surface in the spaces between said corner connectors and said first conductive segments, and between said first conductive segments and said T-shaped segment defines resistances therebetween such that, when a voltage is applied across said surface, the voltage is substantially linear across an active area of said surface.

2. The edge linearization device of claim 1 further comprising a plurality of conductive corner segments located on each side between the outermost of said first conductive segments and said corner connectors.

3. The edge linearization device of claim 1 wherein said first segments follow a generally parabolic path.

4. The edge linearization device of claim 3 wherein said T-shaped segment on each side are located at the vertex of the parabolic path of said first conductive segments.

5. The edge linearization device of claim 4 wherein the overlapping portions of said first conductive segments consist of only two overlapping layers.

6. The edge linearization device of claim 5 wherein at least a portion of the top bar of each of said T-shaped segments overlaps at least a portion of the bottom bar of said first conductive segment adjacent to said T-shaped segment.

7. The edge linearization device of claim 1 wherein said surface is substantially flat.

8. The edge linearization device of claim 1 wherein said surface is nonplanar and conforms to the surface of a CRT.

9. The edge linearization device of claim 1 wherein said surface comprises the outer surface of a CRT.

10. The edge linearization device of claim 1 further comprising:

a cover sheet of a substantially transparent material having an inner and outer surface, wherein the inner surface of said sheet faces said surface and comprises a conductive material; and means for spacing the inner surface of said cover sheet apart from said surface.

11. The edge linearization device of claim 1 wherein said first conductive segments, said T-shaped segment, and said corner connectors comprise a screen printable conductive ink.

12. The edge linearization device of claim 1 wherein said surface comprises a sputtered indium tin oxide layer on a top surface of a transparent sheet.

13. A contact input system comprising:

a surface having a substantially uniform resistivity and defining a substantially rectangular area with four sides and four corners;

a plurality of first conductive segments on each side of said surface, wherein said first conductive segments are located on and electrically connected to said surface and wherein said first conductive segments follow a path that is inwardly disposed into the area of said surface from the sides;

a generally T-shaped conductive segment on each side of said surface, wherein said T-shaped segment is located substantially at the midpoint of each side, wherein said first conductive segments to the left of said T-shaped segment on each side are generally Z-shaped, having a center, a top bar portion and a bottom bar portion, and said first conductive segments to the left of said T-shaped segment are located so that at least a portion of the top bar of each said first conductive segments overlaps at least a portion of the bottom bar of the adjacent one of said first conductive segments, and wherein said first conductive segments to the right of said T-shaped segment on each side are generally of an inverted Z-shape and have a center, a top bar portion and a bottom bar portion, and said first conductive segments to the right of the T-shaped segment are located so that at least a portion of the top bar of each said first conductive segments overlaps at least a portion of the bottom bar of the adjacent one of said first conductive segments;

a plurality of conductive corner segments located on each side at the ends of the path defined by said first conductive segments;

a plurality of conductive corner connectors located on and electrically connected to said resistive surface, wherein said corner connectors form corners between the corner segments of two sides;

wherein said first conductive segments follow a generally parabolic path and each of said T-shaped segments is located at the vertex of the parabolic path of said first conductive segments, and wherein the resistivity of said surface in the spaces between said corner connectors and said first conductive segments, between said first conductive segments, and between said adjacent first segments and said T-shaped segment defines resistances therebetween such that, when a voltage is applied across said surface, the voltage is substantially linear across an active area of said surface;

means attached to said corner connectors for selectively applying voltages to said surface; and means attached to said corner connectors for measuring the voltage at the point where a contact occurs on said surface.

14. The contact input system of claim 13 further comprising:

a cover sheet of a substantially transparent material having an inner and outer surface, wherein the inner surface of said sheet faces said surface and comprises a conductive material; and means for spacing the inner surface of said cover sheet apart from said surface.

15. The contact input system of claim 14 wherein said surface comprises a CRT.

16. The contact input system of claim 14 wherein said surface conforms to a CRT.

17. The contact input system of claim 13 wherein said first conductive segments, said T-shaped segment, and said corner connectors comprise a screen printable conductive ink.

18. The contact input system of claim 13 wherein said surface comprises a sputtered indium tin oxide layer on a top surface of a transparent sheet.

19. An edge linearization device which comprises:

a surface having a substantially uniform resistivity and defining a substantially rectangular area with four sides and four corners:

a plurality of first conductive segments on each side of said surface, wherein said first conductive segments are located on and electrically connected to said surface and wherein said first conductive segments follow a path that is generally parabolic and is inwardly disposed into the area of said surface from the sides;

a generally T-shaped conductive segment on each side of said surface, wherein said T-shaped segment is located substantially at the midpoint of each side and the vertex of the parabolic path of said first conductive segments, wherein said first conductive segments to the left of said T-shaped segment on each side are generally z-shaped, having a center, a top bar portion and a bottom bar portion, and said first conductive segments to the left of said T-shaped segment are located so that at least a portion of the top bar of each said first conductive segments overlaps at least a portion of the bottom bar of the adjacent one of said first conductive segments, and wherein said first conductive segments to the right of said T-shaped segment on each side are generally of an inverted z-shape and have a center, a top bar portion and a bottom bar portion, and said first conductive segments to the right of the T-shaped segment are located so that at least a portion of the top bar of each said first conductive segments overlaps at least a portion of the bottom bar of the adjacent one of said first conductive segments;

a plurality of conductive corner connectors located on and electrically connected to said resistive surface, wherein said corner connectors form corners between adjoining sides; and wherein the resistivity of said surface in the spaces between said corner connectors and said first conductive segments, and between said first conductive segments and said T-shaped segments defines resistances therebetween such that, when a voltage is applied across said surface, the voltage is substantially linear across an active area of said surface.

20. The edge linearization device of claim 19 wherein said surface is nonplanar and conforms to the surface of a CRT.

21. The edge linearization device of claim 19 further comprising:

a cover sheet of a substantially transparent material having an inner and outer surface, wherein the inner surface of said sheet faces said surface and comprises a conductive material; and means for spacing the inner surface of said cover sheet apart from said surface.

22. The edge linearization device of claim 19 wherein said first conductive segments, said T-shaped segment, and said corner connectors comprise a screen printable conductive ink.

23. The edge linearization device of claim 19 wherein said surface comprises a sputtered indium tin oxide layer on a top surface of a transparent sheet.

* * * * *